United States Patent [19]
Halliday

[11] 4,045,193
[45] Aug. 30, 1977

[54] COOLING TOWER DESIGN

[75] Inventor: George Andrew Halliday, Etobicoke, Canada

[73] Assignee: Fabricated Plastics Limited, Rexdale, Canada

[21] Appl. No.: 618,965

[22] Filed: Oct. 2, 1975

[30] Foreign Application Priority Data

Sept. 15, 1975 Canada .................................. 235467

[51] Int. Cl.² .............................................. B01D 47/06
[52] U.S. Cl. ................................. 55/257 PV; 55/267;
55/436; 55/440; 55/480; 55/494; 261/111;
261/118; 261/DIG. 11
[58] Field of Search .................. 55/257 PV, 228, 422,
55/267, 436, 478, 480, 494, 257 R, 257 QV, 257
C, 257 MP, 257 PP, 257 HE, 259, 440; 261/111,
117, 118, DIG. 11

[56] References Cited
U.S. PATENT DOCUMENTS

| 154,645 | 9/1874 | Chase | 55/494 X |
|---|---|---|---|
| 1,748,595 | 2/1930 | Chillas, Jr. et al. | 55/257 PV X |
| 2,356,192 | 8/1944 | Yingling | 55/257 PV X |
| 2,437,484 | 3/1948 | Simons | 261/DIG. 11 X |
| 2,780,306 | 2/1957 | Boyle et al. | 261/111 X |
| 2,808,243 | 10/1957 | Slough et al. | 261/DIG. 11 X |
| 2,892,509 | 6/1959 | Baker et al. | 55/257 PV |
| 3,132,190 | 5/1964 | Engalitcheff, Jr. | 55/257 PV X |
| 3,192,019 | 6/1965 | Hebden et al. | 261/111 X |
| 3,708,958 | 1/1973 | Duty et al. | 261/111 X |
| 3,856,487 | 12/1974 | Perez | 55/228 X |
| 3,865,911 | 2/1975 | Lefevre | 261/DIG. 11 X |
| 3,870,487 | 3/1975 | Hurlbut, Sr. et al. | 55/436 |

FOREIGN PATENT DOCUMENTS

| 323,286 | 3/1903 | France | 261/117 |
|---|---|---|---|
| 1,542,197 | 6/1970 | Germany | 261/DIG. 11 |

Primary Examiner—Frank W. Lutter
Assistant Examiner—Kathleen J. Prunner
Attorney, Agent, or Firm—G. James M. Shearn

[57] ABSTRACT

The invention provides for easy, efficient repair and maintenance of cooling towers by a design in which the internal elements such as liquid distribution pipes, demister, grating and the like are structurally unified with a supporting means so that they can be removed from or replaced in the tower as a unit.

8 Claims, 7 Drawing Figures

COOLING TOWER DESIGN

This invention relates to improvements in the design and operation of cooling towers of the counter-current, air-liquid type in which a liquid to be cooled is caused to splash down, under gravity, through an upward rising flow of ambient air.

More particularly it relates to improvements in cooling tower design by which the internal elements may be more readily accessible for inspection, maintenance or repair.

It is therefore the object of this invention to provide a cooling tower in which the internal elements such as the liquid distribution pipes, nozzles, demisters, etc. may be more accessible to workmen.

Cooling towers of the fore-mentioned type commonly have a tubular upright tower wall with an air inlet near the bottom and means for distributing the liquid in a spray at the top so that the liquid is cooled by falling in a spray, down through a rising (counter-current) flow of ambient air; this counter-current flow of fluids being contained by the surrounding wall of the tower.

This type of tower conventionally requires a system of pipes and outlet nozzles or ports, and perhaps splash plates, to distribute the liquid to be cooled (hereinafter referred to as the liquid), and to cause it to be cast into a spray. This system can generally be referred to as the liquid distribution means.

Where the liquid (or other substance involved) is of a toxic or pollutant nature (or for other reasons) it is often required that the tower be equipped with demisters to prevent the rising air current from carrying off vapour of the liquid out of the tower to contaminate the surrounding area. There may also be a supporting structure and walkways or grating to allow workmen access to the internal elements.

Conventionally all of these, and other features (herein generally referred to as internals) have been more or less installed as an integral part of the structure of the cooling tower, and are usually affixed to the walls of the tower itself. Inspection or repair of these internals requires workmen to enter the tower to do their work so that the operation of the tower has to be shut down.

If the liquid (or other substance used) is toxic there exists a considerable danger to workmen in the confined space of the tower, or alternatively extensive cleaning out of the tower is required before work can be done.

Since the internals are usually located in the upper portion of the cooling tower work there involves some danger, time consuming safety precautions, and as a work place is generally awkward and inaccessible.

The confined space of the tower is often hot and uncomfortable, or sometimes constitutes a convenient hiding place where workmen take unauthorized rest and relaxation without detection.

This invention recognizes that the aforementioned inconvenience and inefficiency could be largely overcome if the internals could be removed from the tower to the ground and perhaps replaced with a second set of internals to allow the tower to be put back in operation.

These disadvantages are sought to be overcome by the present invention in which the internals of the cooling tower, such as the liquid distribution means, demisters, and the supporting structures are all constructed as an integral unit capable of being placed within the tower to rest on the tower wall and further capable of removal from such tower as a unit to enable the internals to be placed on the ground or removed to a shop for easier inspection maintenance or repair. Such a design would allow for replacement of the internals by a similar unit to allow the tower to be quickly put back in operation during the maintenance, thereby avoiding costly shutdowns.

The invention will be better understood by reference to the following description of one embodiment illustrated in the accompanying drawings in which.

Figure 1:
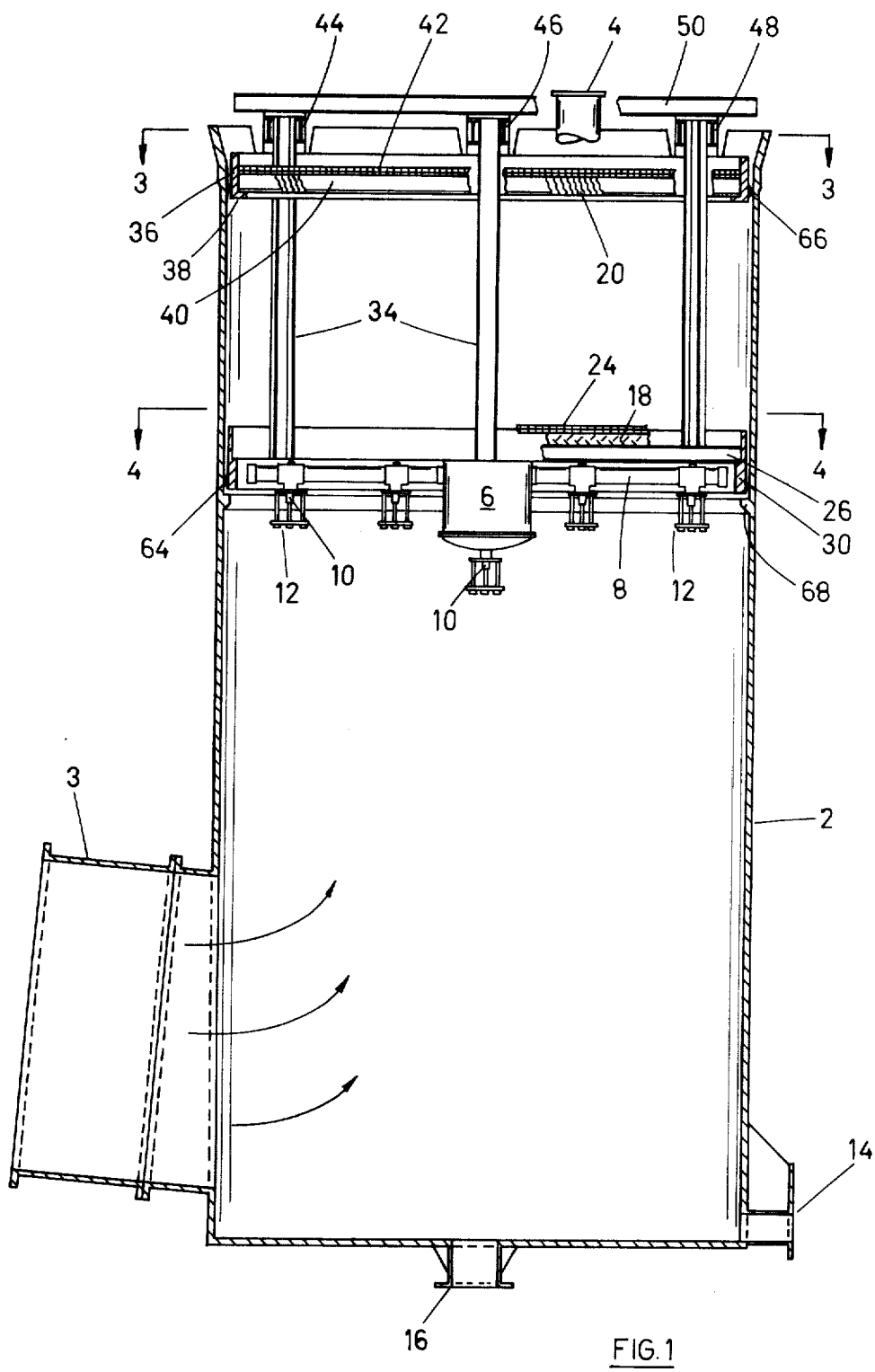
FIG. 1 is a vertical cross section of one embodiment of a cooling tower of the present invention.

A cooling tower, of the type mentioned, in accordance with the present invention is illustrated in the cross sectional view of FIG. 1 in which the wall 2 of the tower is cylindrical (although it might be rectangular or other shapes) and provides an upright conduit or flue confining the counter-current flow of liquid and air. Air may be introduced into the tower by means of the air inlet duct 3 communicating with the lower end of the flue of the tower to provide an upwardly rising flow of air as illustrated by the arrows in FIG. 1. The air inlet duct is inclined downwardly towards the tower so as to prevent liquid from escaping out of the tower system through the duct. Air may be supplied by any conventional means such as a fan adapted to drive atmospheric air into the duct.

The liquid component is introduced through the liquid inlet pipe 4 which leads from its opening near the top of the cooling tower structure to the distribution pot 6. The liquid inlet pipe opening is adapted to be connected by suitable means to a conduit leading from a source of liquid to be cooled such as acid or other chemicals used in industrial processes like mineral refining and concentration.

Figure 4:
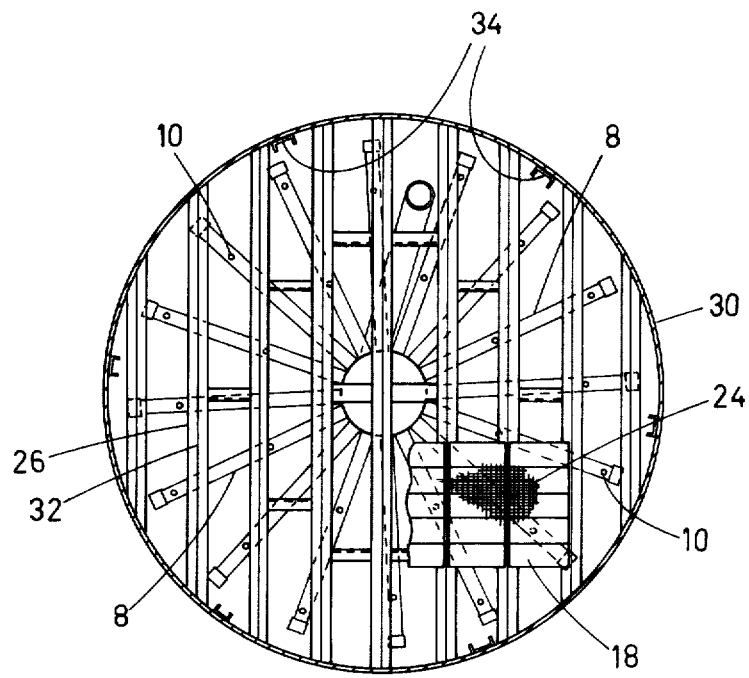
FIG. 4 is a horizontal cross-section through the line 4—4 of the tower in FIG. 1.

The liquid is distributed in the cooling tower by way of distribution pipes 8—8 which radiate out from the distribution pot, as seen in FIG. 4, to extend across the entire area of the tower. The distribution pipes have outlet ports 10 located in the underside to release the liquid and allow it to drop vertically downwards (under the influence of gravity) in the flue of the cooling tower. To further scatter and disperse the liquid and create a spray horizontal splash plates 12 are located underneath the outlet ports 10 in the manner illustrated in FIG. 1 and at locations indicated in FIG. 4.

If desired troughs or launders, of known design might be used instead of pipes in the liquid distribution means.

Thus while air of ambient temperature is caused to flow upwards in the cooling tower the hot liquid is introduced through the inlet pipe 4 and distributed by the distribution system to the outlet ports and splash plates so as to drop in a fairly uniform spray downwards through the air current, and be cooled thereby.

The cooled liquid drops to the bottom of the flue of the cooling tower and is taken off for further use by means of the liquid outlet port 14. An additional port 16 in the floor of the cooling tower is normally closed but is available for purposes of cleaning out the tower and the like.

Since there is a tendency in cooling towers of this type for the rising air current to carry off fine droplets of the liquid in the form of vapour or mist it is important to provide means for eliminating this vapour from the air current, especially if the liquid is valuable or if it is a toxic contaminant in the surrounding area. This vapour is substantially eliminated by one or more demister beds such as those illustrated at 18 and 20 in FIG. 1 and shown in greater detail at 18 in FIG. 5. Such demisters occur in a great variety of designs but commonly incorporate a set of vanes or baffles such as 22 in FIG. 5 which cause some diversion or change of direction in the air flow and tend to cause liquid droplets in the air current to drop out or deposit themselves on the vanes and to fall back down into the cooling tower rather than be carried out into the flue with the air stream. Demisters of the type illustrated are conventionally installed as a bed covering the entire area of the tower and are made up of a series of manageable sized segments such as that illustrated in FIG. 5 placed side by side in the manner schematically shown at 18 in FIG. 4. In those two drawings only a portion of the complete bed is illustrated for simplicity and clarity.

In FIG. 1 two demister beds are illustrated at 18 and 20 respectively and commonly such a design would use a set of course demisters on the lower bed at 18 and a set of fine (closer spaced) demisters in the upper bed at 20.

Figure 3:
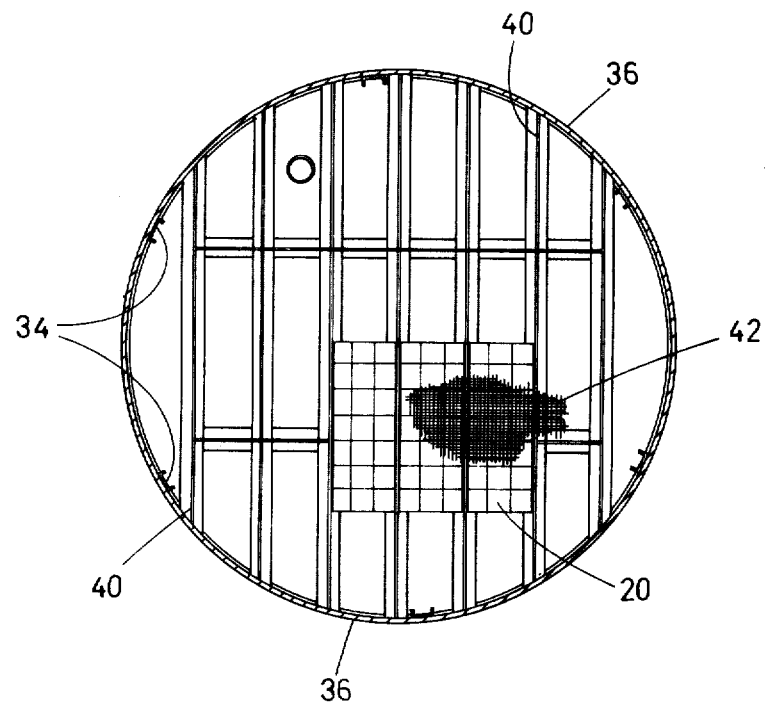
FIG. 3 is a horizontal cross-section through the line 3—3 of the tower in FIG. 1.
Figure 5:
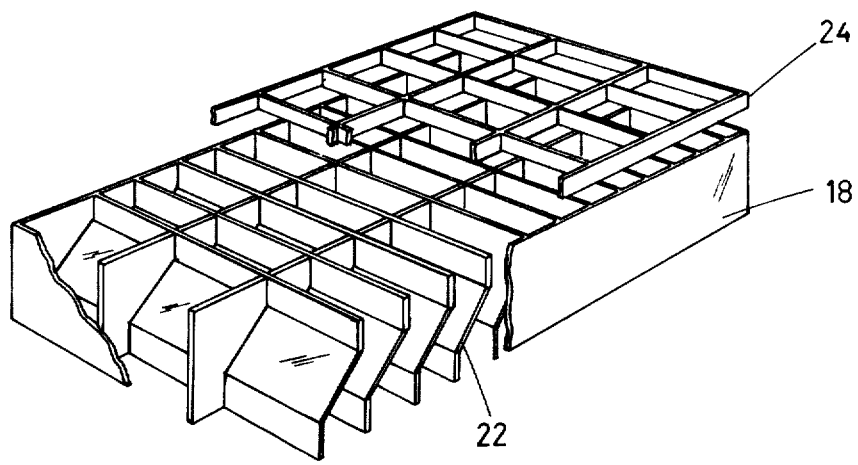
FIG. 5 is a detailed prospective view of part of the demisters and grating partially shown in FIGS. 1, 3 and 4.

Also shown in detail in FIG. 5 is a grating 24 which is intended to overlie and rest on top of the demister beds as illustrated schematically at 24 in FIGS. 1, 3 and 4. This grating serves either or both of the functions of providing a walking platform capable of supporting a workman or providing sufficient weight to hold down the demisters against the tendency of the uprising air currents to lift them out of their position. This latter problem is especially prevalent when the demisters become clogged by deposits which increase the resistance to the air flow.

The aforementioned liquid distribution systems, demister beds, and grates are all supported in the illustrated embodiment by a structural frame work having (generally speaking) an upper and lower platform.

The lower platform may be understood by reference to FIG. 1 and FIG. 4 and comprises a lattice of mutually perpendicular connected I beams 26 terminating at the periphery in a surrounding ring 30 of slightly smaller diameter then the internal diameter of the cooling tower wall. As seen in FIG. 1 the surrounding ring 30 has a ledge around its inner face on which the ends of the beams 26 rest.

Although the means are not shown in detail it will be understood from FIG. 4 that the distribution pipes and the distribution pots can be conveniently suspended from the aforementioned I beams of the lower platform and are thereby supported.

Figure 6:
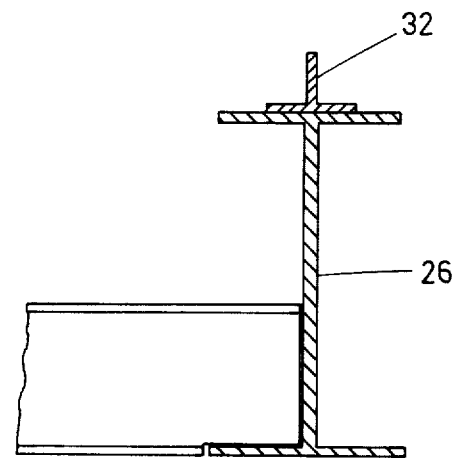
FIG. 6 is a vertical cross-section showing details of part of the platform structure shown in FIG. 4.

The demister sections rest on top of the I beams and are located in position by means of up standing walls provided by inverted T members 32 as illustrated in FIG. 6, which run along the tops of the I beams as shown in FIG. 3 to form compartments for the demister sections.

The entire lower platform is suspended from six vertical channel members 34 attached to the inner surface of the surrounding ring 30 at six equally spaced locations around its circumference.

The upper platform has a surrounding ring 36 also attached to the vertical channel members 34 and adapted by an inwardly projecting ledge 38 to support a grid of mutually perpendicular inverted T members at the location 40 in FIG. 1. This grid is not shown in detail but forms a lattice or grid as illustrated in FIG. 3. The demister sections 20 are supported and contained within compartments provided by the grid of inverted T members similar to the lower platform. A similar grating 42 rests on top.

Figure 2:
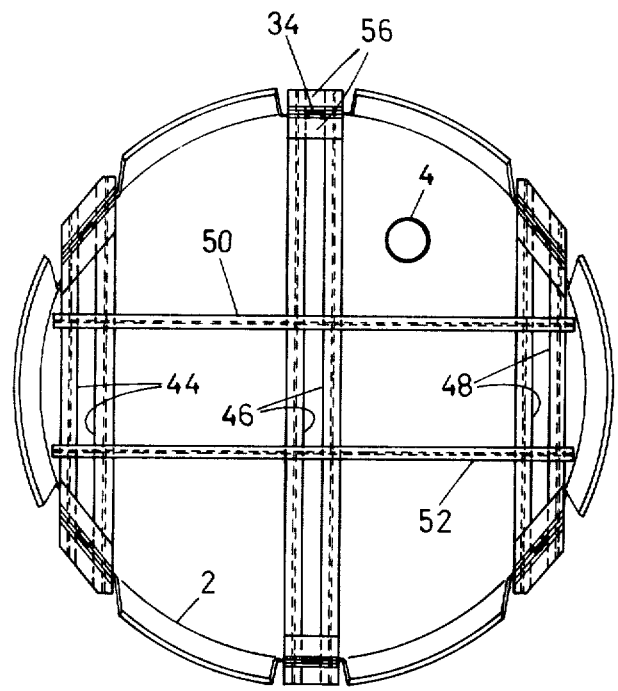
FIG. 2 is a plan view of upper structural elements of the tower in FIG. 1.

Both platforms are supported by the vertical channel members 34 which in turn are suspended from 3 pairs of horizontal I beams 44, 46 and 48 respectively. These pairs of I beams serve as supports for the internals and rest at their ends on the tower wall 2 in recesses 62 located at six points around the top of the tower as best seen in FIG. 2.

Two additional I beams 50 and 52 are connected perpendicularly across the pairs of supporting I beams to provide increased structural rigidity.

It will be noted that the ends of the pairs of I beams coincide with the six locations of the vertical channel members to which they are attached.

Figure 7:
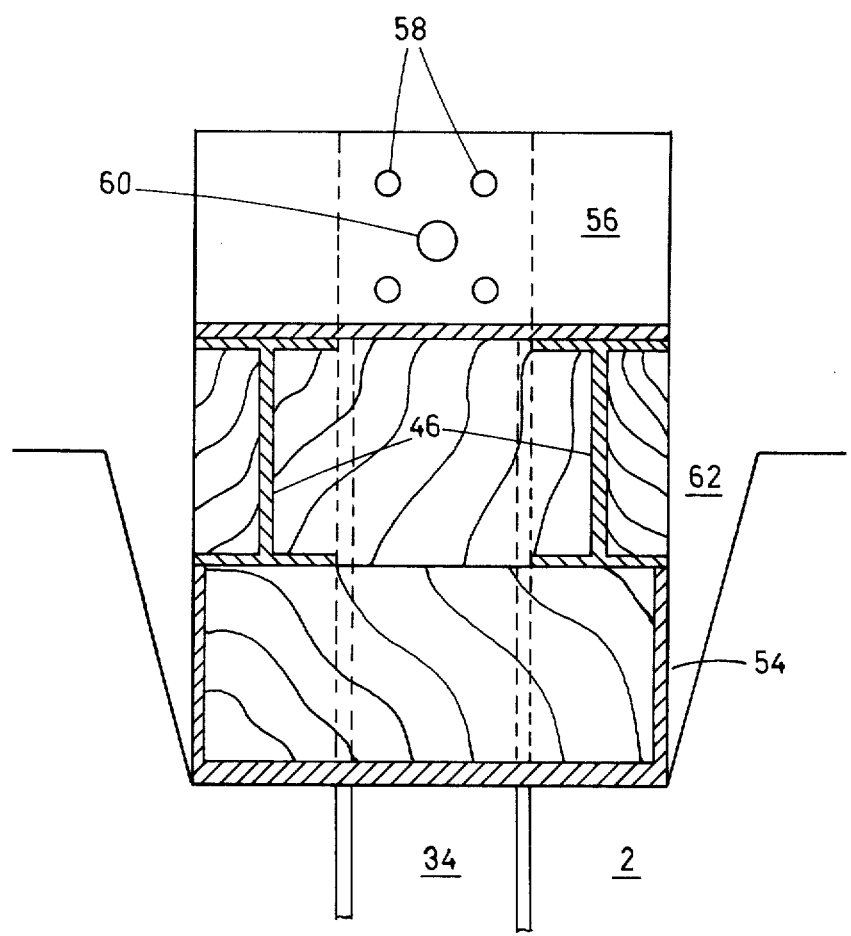
FIG. 7 is a vertical cross-section showing details of the lifting lugs seen generally in FIGS. 1 and 2.

The details of the structure of the connection between the vertical channels and the pairs of I beams at the position where they rest at the top of the tower wall is illustrated in FIG. 7. The pair of supporting I beams 46 rest on top of a pad 54 on top of the tower wall 2. On top of the I beams is a pair of back-to-back angle members 56 with the horizontal flange resting across the top of the I beams and the vertical flange bracketing the web of the channel between them. Bolt holes 58 provide for fastening the vertical channels to the angle flanges 56 to transmit the load to the supporting I beams. An additional hole 60 in at least three of the locations provides convenient means for attaching cables or other devices for lifting the entire structure forming the internals unit by a crane.

The space 62 represents the aforementioned recess in the upper portion of the wall 2, of which there are six.

Depending on the material used for construction the pad 54 may be reinforced by filling the interior space with some material such as wood as might be suitable for non-metal construction with plastics. For additional strength the spaces between the I beams might also be filled in this way.

Thus by constructing the internals of the cooling tower so that pipes, demisters, grating, etc. are all supported on platforms which are part of a supporting means, so that they comprise an integrated structural entity or unit, independent of the rest of the tower, but capable of being suspended by the supporting pairs of I beams from the top of the cooling tower wall, all of the internals and their structural supports can be placed in the tower and removed from the tower as a unit in a single operation. For instance by using a crane with three cables attached to the lifting holds 60 at three equidistant locations around the structure all of the internals can be lifted out of the cooling tower and placed on the ground where they are readily accessible to workmen, or alternatively can be removed to a workshop.

Furthermore a similar unit of internals could be kept on hand and placed in the tower to return it to operation while the necessary repairs are carried on.

To facilitate placement of the internal unit the upper portion of the tower wall 2 is flared outwards thereby easing insertion of the rings 30 and 36. The outer dimensions of these rings are preferably very close to the internal diameter of the wall 2 so as to minimize the diversion of air around the demisters. If necessary seals such as illustrated at 64 and 66 can be used to counter this tendency.

Additionally in FIG. 1 there is illustrated a safety ring 68 which serves to prevent the internal units from dropping into the flue of the cooling tower in the event of mishap or may alternatively be used as a support for the internal unit, depending on the details of the design employed.

The material used in the construction of such a cooling tower will depend on the substances which come in contact with the equipment. Although structurally steel would be suitable corrosive chemicals may dictate that the structure be made of some more inert material such as reinforced plastics and the present design has been found suitable in such cases with appropriate design considerations. Instead of welding the structural elements can be bonded chemically.

Other modifications and variations may be adapted to suit specific purposes without departing from this inventive concept.

What I claim as new and desire to protect by Letters Patent of the United States is:

1. A cooling tower for cooling liquid by counter-current flow through a rising flow of air comprising:
   an upright surrounding wall having an upper end, and defining a flue adapted to contain said counter-current flow of liquid and air;
   conduit means adapted to distribute said liquid to substantially the entire area of said flue and having outlet ports at spaced intervals adapted to disperse said liquid into said air flow;
   demister means disposed across the flue in the path of said air flow and adapted to remove vapour therefrom;
   support means adapted to support said liquid conduit means and said demister means in said tower and adapted to permit removal and replacement thereof as a unit; said support means including:
   horizontal beams spanning across said flue to rest on the upper end of said wall;
   a plurality of vertical members depending from said beams within said flue adjacent to said wall;
   a ring mounted on said vertical members and extending horizontally around said flue parallel to and in close proximity to said wall and having an inwardly projecting ledge;
   a platform formed of a lattic of intersecting beams resting at their outer ends on said ledge of said ring; said platform thus being adapted to support said demister means resting thereon and said liquid distribution means hanging therefrom.

2. A cooling tower as claimed in claim 1 in which said liquid distribution means includes an inlet pipe mounted to enter downwardly into said cooling tower and a plurality of horizontally extending pipes connected to said inlet pipe and radiating from the centre of said flue to substantially the entire area thereof, said radiating pipes having said outlet ports therein, and being suspended from said platform.

3. A cooling tower as claimed in claim 2 in which said platform has a grid of inverted T members mounted on top of and parallel to said platform beams respectively to form a number of compartments each adapted to receive therein a segment of said demister means.

4. A cooling tower as claimed in claim 3 in which said demister means, said liquid distribution means, and said support means are made of plastic materials.

5. A cooling tower for cooling liquid by counter-current flow through a rising flow of air comprising:
   an upright surrounding wall having an upper end, and defining a flue adapted to contain said counter-current flow of liquid and air;
   conduit means adapted to distribute said liquid to substantially the entire area of said flue and having outlet ports at spaced intervals adapted to disperse said liquid into said air flow;
   demister means disposed across the flue in the path of said air flow and adapted to remove vapour therefrom;
   support means adapted to support said liquid conduit means and said demister means in said tower and adapted to permit removal and replacement thereof as a unit; said support means including:
   horizontal beams spanning across said flue to rest on the upper end of said wall;
   a plurality of vertical members depending from said beams within said flue adjacent to said wall;
   a first ring and a second ring respectively mounted on said vertical members and extending horizontally around said flue parallel to and in close proximity to said wall and having an inwardly projecting ledge;
   a first platform and a second platform respectively formed of a lattice of intersecting beams resting at their outer ends on the ledge of said rings respectively;
   said first platform being spaced above said second platform and being thus adapted to support said demister means resting thereon and said liquid distribution means being suspended from said second lower platform.

6. A cooling tower as claimed in claim 5 in which said liquid distribution means includes an inlet pipe mounted to enter downwardly into said cooling tower and a plurality of horizontally extending pipes connected to said inlet pipe and radiating from the center of said flue to substantially the entire area thereof, said radiating pipes having said outlet ports therein and being suspended from said second platform.

7. A cooling tower as claimed in claim 6 in which said first upper platform has a grid of inverted T members mounted on top of and parallel to said platform beams respectively to form a number of compartments each adapted to receive therein a segment of said demister means.

8. A cooling tower as claimed in claim 7 in which said demister means, said liquid distribution means, and said support means are made of plastic materials.

* * * * *